(12) United States Patent
Pamoti et al.

(10) Patent No.: US 12,307,133 B1
(45) Date of Patent: May 20, 2025

(54) DETERMINISTIC RESIZING OF UNMAP COMMANDS

(71) Applicant: Sandisk Technologies, Inc., Milpitas, CA (US)

(72) Inventors: Venkatesh Naidu Pamoti, Bangalore (IN); Sowjanya Sunkavelli, Bengaluru (IN); Dheemahi Turaga, Bengaluru (IN); Raju Singh, Bengaluru (IN)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/589,138

(22) Filed: Feb. 27, 2024

(51) Int. Cl.
  *G06F 3/06* (2006.01)
(52) U.S. Cl.
  CPC .......... *G06F 3/0659* (2013.01); *G06F 3/0611* (2013.01); *G06F 3/0679* (2013.01)
(58) Field of Classification Search
  CPC .... G06F 3/0659; G06F 3/0611; G06F 3/0679; G06F 2212/7206
  See application file for complete search history.

(56) References Cited

U.S. PATENT DOCUMENTS

2019/0303285 A1* 10/2019 Park ...................... G06F 3/0679

* cited by examiner

*Primary Examiner* — Chie Yew
(74) *Attorney, Agent, or Firm* — DENTONS Durham Jones Pinegar (57) ABSTRACT

A data storage device includes an unmap command analysis system that dynamically determines a size, or a LBA range, of an unmap command executed on the data storage device. The size of the unmap command is based, at least in part, on an amount of random data stored by the data storage device. The unmap command analysis system determines whether to check the amount of random data stored by the data storage device in response to a trigger event. When the trigger event is detected and the amount of random data is determined, the unmap command analysis system compares the amount of random data to information in an unmap command size table. The unmap command size table indicates which unmap command sizes are most efficient based on the determined amount of random data stored by the data storage device.

20 Claims, 5 Drawing Sheets

DETERMINISTIC RESIZING OF UNMAP COMMANDS

BACKGROUND

An unmap command executed on a data storage device causes a controller of the data storage device to invalidate a mapping between a logical block address (LBA) and an associated physical memory block in the data storage device. Typically, the maximum size, or a range of LBAs, of the unmap command is set to a fixed/predetermined value.

However, an amount of time required to complete the unmap commands varies based, at least in part, on the type of data that is stored by the data storage device. For example, if the data storage device includes a large percentage of sequential data, the unmap commands are executed relatively quickly. However, if the data storage device includes a large percentage of random data, the amount of time it takes to complete the unmap commands increases. As the amount of random data increases, the risk of a timeout condition and/or a failure of the data storage device also increases.

Accordingly, it would be beneficial to reduce the risk of failures and/or timeout conditions during execution of unmap commands.

SUMMARY

The present disclosure describes a data storage device that includes, or is otherwise associated with, an unmap command analysis system. The unmap command analysis system dynamically determines a size, or a logical block address (LBA) range, of an unmap command. In an example, the size of the unmap command is based, at least in part, on an amount of random data stored by the data storage device.

For example, at various times, such as when a trigger event is detected, the unmap command analysis system determines the amount of random data (or a percentage of random data) stored by the data storage device. In an example, the trigger event is associated with a threshold number of operations (e.g., write operations and/or unmap operations) being executed on the data storage device. In another example, the trigger event is associated with a threshold amount (e.g., 10 seconds) of idle time that is available to the data storage device.

When the amount of random data is determined, the unmap command analysis system compares the amount of random data to information in an unmap command size table. The unmap command size table indicates which unmap command sizes are most efficient or optimal (when compared to other unmap command sizes) based, at least in part, on the determined amount of random data stored by the data storage device.

When the optimal unmap command size is determined, the unmap command analysis system notifies the host device of the newly determined unmap command size. When unmap commands are subsequently issued by the host device and received by the unmap command analysis system, the unmap commands are executed using the determined unmap command size. In an example, the determined unmap command size specifies a maximum size of the unmap command. As such, a host device can issue any size of unmap command, up to and/or including, the maximum size.

Accordingly, examples of the present disclosure describe a method that includes performing a first unmap command on a first range of logical block addresses (LBAs) of a memory device using a first unmap command size. In an example, the first unmap command size is associated with a first amount of a type of data stored in the memory device. The method also includes determining a current amount of the type of data in the memory device and determining whether the current amount of the type of data in the memory device is associated with a second unmap command size that is different than the first unmap command size. When it is determined that the current amount of the type of data in the memory device is associated with the second unmap command size, a second unmap command is performed on a second range of LBAs. In an example, the second unmap command is performed using the second unmap command size.

Other examples describe a data storage device that includes a controller and an unmap command analysis system. In an example, the unmap command analysis system is operable to determine an amount of random data stored in the data storage device. The unmap command analysis system is also operable to compare the amount of random data stored in the data storage device to information associated with an unmap command size table. The unmap command analysis system also sets an unmap command size of an unmap command based, at least in part, on the information associated with the unmap command size table.

Still other examples describe a data storage device that includes means for determining an amount of random data stored in the data storage device. The data storage device also includes means for comparing the amount of random data stored in the data storage device to unmap command size information. The data storage device also includes means for configuring an unmap command size for an unmap command based, at least in part, on the information associated with the unmap command size information.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. The following detailed description is therefore not to be taken in a limiting sense, and the scope of the present disclosure is defined by the appended claims and their equivalents.

Unmap commands executed on a data storage device causes a controller of the data storage device to perform a logical invalidation of a requested range of logical block addresses (LBAs). However, the process of invalidation for sequential data differs from the process of invalidation for random data due to the way in which logical addressing is done in the back end of the data storage device.

For example and based on the data storage device, a size of a logical group of data is predefined (e.g., four megabytes (MB)). A directory, such as a logical to physical (L2P) address table, is used to map each logical group to a physical location of the data storage device at which the data is stored. When sequential data is stored, the sequential data is stored in at least one logical group and each sequential logical group is represented by a single entry in the L2P table. However, random data is associated with multiple entries and each entry is typically associated with a different pointer. In an example, random data is any sequence of data that is less than the size of one logical group.

When an unmap command is executed on sequential data, the entry associated with the sequential data is read and invalidated. However, when an unmap command is executed on random data, the L2P table is read, and the pointers are used to traverse multiple entries in the L2P table in order to invalidate each of the entries. Thus, the amount or number of operations increases when an unmap command is executed on random data when compared with sequential data. As the amount of random data stored by the data storage device increases, so do the number of operations. As such, the risk of a timeout condition and/or a failure of the data storage device increases.

To address the above, the present disclosure describes a data storage device that includes an unmap command analysis system. The unmap command analysis system dynamically determines a size, or a logical block address (LBA) range, of an unmap command. In an example, the size, or the LBA range, of the unmap command is a maximum size, or a maximum LBA range, that the data storage device supports. As such, a host device can issue any size of unmap command, up to and/or including, the maximum size. In an example, the maximum size of the unmap command is dynamic and is based, at least in part, on an amount, or a percentage, of random data stored by the data storage device.

As will be explained in greater detail herein, the unmap command analysis system determines the amount of random data stored by the data storage device. The unmap command analysis system compares the determined amount of random data to information in an unmap command size table. The unmap command size table indicates which unmap command sizes (e.g., 2 gigabyte (GB) unmap command sizes, 4 GB unmap command sizes) are the most efficient or optimal (when compared to other unmap command sizes) based, at least in part, on the determined amount of random data stored by the data storage device.

In an example, the unmap command size table is populated using a test data storage device that is similar to the data storage device. For example, the test data storage device and the data storage device have the same or similar capacity and/or the same or similar configurations. During a configuration or testing event, the test data storage device is completely filled (e.g., 100% filled) with a first type of data (e.g., sequential data). Various unmap commands, having different values/unmap command sizes (e.g., 2 GB, 4 GB, 8 GB, 16 GB), are issued for the entire capacity of the test data storage device. A determination is then made as to which value/unmap command size has the best performance.

The percentage of the first type of data stored in the data storage device is incrementally changed to increase the amount of a second type of data (e.g., random data). For example, the test data storage device is configured to store 95% sequential data and 5% random data. The above experiment is repeated and the unmap command size having the best performance is determined.

In an example, this is repeated with various increments of the first type of data and the second type of data until the test data storage device is filled (e.g., 100% filled) with the second type of data (e.g., filled with random data). The optimal unmap command size for each degree of randomness is tabulated and stored in the unmap command size table. The unmap command size table is then loaded on the data storage device (e.g., using config files and accessible to the data storage device via firmware).

When the optimal unmap command size for a determined amount of random data is identified, the unmap command analysis system notifies the host device of the identified unmap command size. When unmap commands are subsequently issued by the host device and received by the unmap command analysis system, the unmap commands are executed using the identified unmap command size.

In an example, the unmap command analysis system determines the percentage of the first type of data and/or the second type of data, and the optimal unmap command size, after a threshold number of operations (e.g., write operations and/or unmap operations) have been executed on the data storage device. In another example, the unmap command analysis system determines the amount of the first type of data and/or the second type of data, and the optimal unmap command size, when the data storage device has over a threshold amount (e.g., 10 seconds) of idle time available.

Accordingly, many technical benefits may be realized including, but not limited to, increasing the efficiency of executing unmap commands by reducing an amount of time that is required to perform unmap commands on random data and on sequential data and reducing the risk of timeout conditions or other failures.

These benefits, along with other examples, will be shown and described in greater detail with respect to FIG. 1-FIG. 6.

Figure 1:
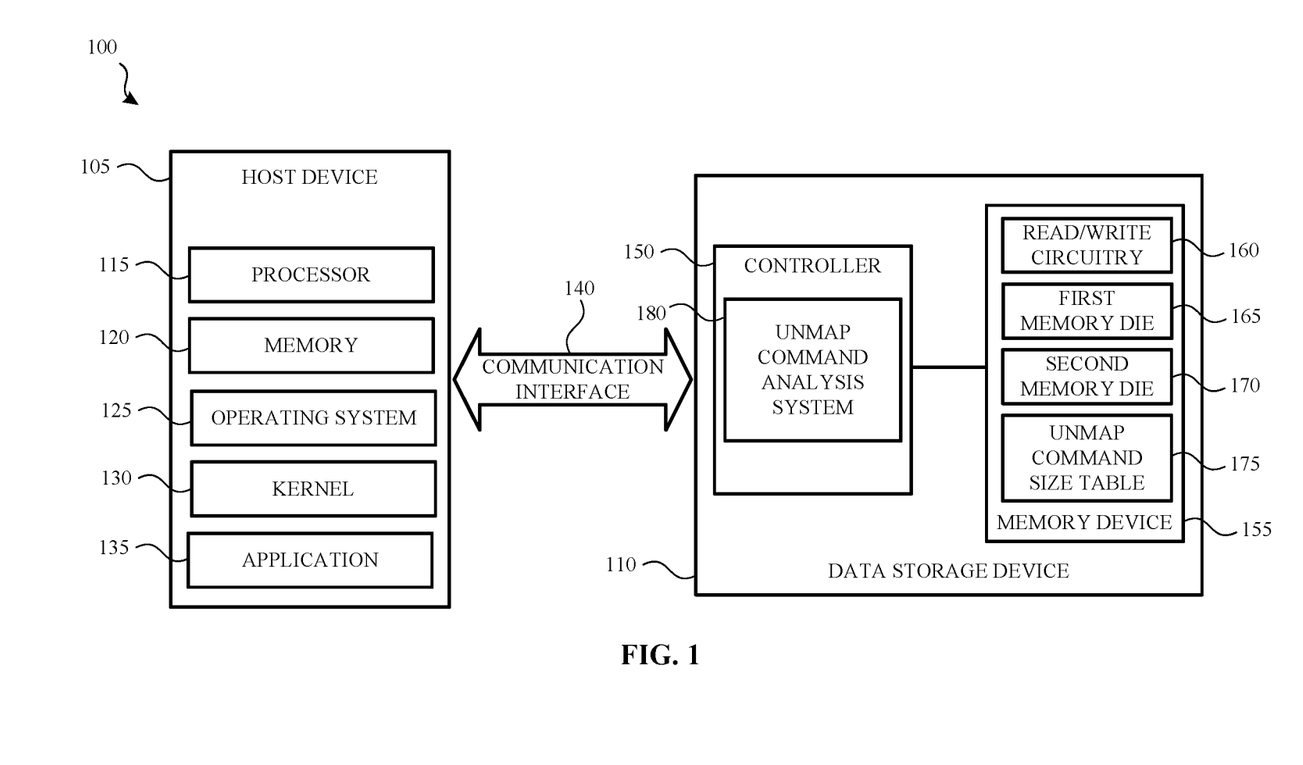
FIG. 1 is a block diagram of a system that includes a host device and a data storage device according to an example.

FIG. 1 is a block diagram of a system 100 that includes a host device 105 and a data storage device 110 according to an example. The host device 105 includes a processor 115 and a memory 120 (e.g., a main memory). The memory 120 may include or otherwise be associated with an operating system 125, a kernel 130 and/or an application 135.

The processor 115 can execute various instructions, such as, for example, instructions from the operating system 125 and/or the application 135. The processor 115 includes circuitry such as a microcontroller, a Digital Signal Processor (DSP), an Application-Specific Integrated Circuit (ASIC), a Field Programmable Gate Array (FPGA), hard-wired logic, analog circuitry and/or various combinations thereof. In an example, the processor 115 includes a System on a Chip (SoC).

In an example, the memory 120 is used by the host device 105 to store data used, or otherwise executed by, the processor 115. Data stored in the memory 120 includes instructions provided by the data storage device 110 via a communication interface 140. The data stored in the memory 120 also includes data used to execute instructions from the operating system 125 and/or one or more applications 135. The memory 120 may be a single memory or may include multiple memories, such as, for example one or more non-volatile memories, one or more volatile memories, or a combination thereof.

In an example, the operating system 125 creates a virtual address space for the application 135 and/or other processes executed by the processor 115. The virtual address space may map to locations in the memory 120. The operating system 125 may also include or otherwise be associated with a kernel 130. The kernel 130 includes instructions for managing various resources of the host device 105 (e.g., memory allocation), handling read and write operations and so on.

The communication interface 140 communicatively couples the host device 105 and the data storage device 110. The communication interface 140 may be a Serial Advanced Technology Attachment (SATA), a PCI express (PCIe) bus, a Small Computer System Interface (SCSI), a Serial Attached SCSI (SAS), Ethernet, Fibre Channel, or Wi-Fi. As such, the host device 105 and the data storage device 110 need not be physically co-located and may communicate over a network such as a Local Area Network (LAN) or a Wide Area Network (WAN), such as the internet. In addition, the host device 105 may interface with the data storage device 110 using a logical interface specification such as Non-Volatile Memory express (NVMe) or Advanced Host Controller Interface (AHCI).

In an example, the data storage device 110 includes a controller 150 and a memory device 155. The controller 150 is communicatively coupled to the memory device 155. In an example, the memory device 155 includes one or more memory dies (e.g., a first memory die 165 and a second memory die 170). Although memory dies are specifically mentioned, the memory device 155 may include any non-volatile memory device, storage device, storage elements or storage medium including NAND flash memory cells and/or NOR flash memory cells.

The memory cells can take the form of solid-state (e.g., flash) memory cells and can be one-time programmable, few-time programmable, or many-time programmable. Additionally, the memory cells may be single-level cells (SLCs), multi-level cells (MLCs), triple-level cells (TLCs), quad-level cells (QLCs), penta-level cells (PLCs), and/or use any other memory technologies. The memory cells may be arranged in a two-dimensional configuration or a three-dimensional configuration.

In an example, the data storage device 110 is attached to or embedded within the host device 105. In another example, the data storage device 110 is an external device or a portable device that is communicatively or selectively coupled to the host device 105. In yet another example, the data storage device 110 is a component (e.g., a solid-state drive (SSD)) of a network accessible data storage system, a network-attached storage system, a cloud data storage system, and the like.

As previously explained, the memory device 155 of the data storage device 110 includes a first memory die 165 and a second memory die 170. Although two memory dies are shown, the memory device 155 may include any number of memory dies (e.g., one memory die, two memory dies, eight memory dies, or another number of memory dies).

The memory device 155 also includes support circuitry. In an example, the support circuitry includes read/write circuitry 160. The read/write circuitry 160 supports the operation of the memory dies of the memory device 155. Although the read/write circuitry 160 is depicted as a single component, the read/write circuitry 160 may be divided into separate components, such as, for example, read circuitry and write circuitry. The read/write circuitry 160 may be external to the memory dies of the memory device 155. In another example, one or more of the memory dies may include corresponding read/write circuitry 160 that is operable to read data from and/or write data to storage elements within one individual memory die independent of other read and/or write operations on any of the other memory dies.

In an example, each of the first memory die 165 and the second memory die 170 include one or more memory blocks and each memory block includes one or more memory cells. A block of memory cells is the smallest number of memory cells that are physically erasable together. In an example and for increased parallelism, each of the blocks may be operated or organized in larger blocks or metablocks. For example, one block from different planes of memory cells may be logically linked together to form a metablock.

In an example, the memory blocks are referred to as physical memory blocks because they relate to groups of physical memory cells. In an example, a logical memory block is a virtual unit of address space defined to have the same size as a physical memory block. Each logical memory block includes a range of logical memory block addresses (LBAs) that are associated with data received from the host device 105. The LBAs are mapped to one or more physical memory blocks in the data storage device 110 where the data is physically stored. The data that is stored may be random data or sequential data.

The memory device 155 also includes an unmap command size table 175. The unmap command size table 175 includes information about a size of unmap commands that are most efficient or optimal (when compared to other sizes of unmap commands) based, at least in part, on a determined amount of a first type of data (e.g., sequential data) and/or a second type of data (e.g., random data) stored by the data storage device 110. For example, if the data storage device 110 includes a first amount of random data, the unmap command size table 175 indicates that a first unmap command size should be used when unmap commands are executed. However, if the data storage device 110 includes a second amount of random data, the unmap command size table 175 indicates that a second unmap command size should be used when unmap commands are executed.

In an example, the unmap command size table 175 is configured or populated with information based, at least in part, on various test cases that are executed on a test data storage device during a configuration or testing event/process. For example, during the configuration event, the test data storage device, that is similar to the data storage device 110 (e.g., the test data storage device and the data storage device 110 have the same or similar capacity and/or the same or similar configurations) is completely filled (e.g., 100% filled) with a first type of data (e.g., sequential data). Various unmap commands, having different values/unmap command sizes (e.g., 2 GB, 4 GB, 8 GB, 16 GB), are issued for the entire capacity of the test data storage device 110. A determination is then made as to which unmap command size has the best performance.

The type of data stored in the test data storage device is incrementally changed to increase the amount of a second type of data (e.g., random data). For example, the test data storage device is configured to store 95% sequential data and 5% random data. The above experiment is repeated and the unmap command size having the best performance for this new division of data is determined.

This process is repeated during the configuration event with various increments of random data and/or sequential data until the test data storage device is filled (e.g., 100% filled) with the second type of data (e.g., random data). The optimal unmap command sizes for each degree of randomness are calculated and stored in the unmap command size table 175.

As previously described, the data storage device 110 also includes a controller 150. The controller 150 is communicatively coupled to the memory device 155 via a bus, an interface or other communication circuitry. In an example, the communication circuitry includes one or more channels to enable the controller 150 to communicate with the first memory die 165 and/or the second memory die 170 of the memory device 155. In another example, the communication circuitry includes multiple distinct channels which enables the controller 150 to communicate with the first memory die 165 independently and/or in parallel with the second memory die 170 of the memory device 155.

The controller 150 also receives data and/or instructions/commands from the host device 105. The controller 150 may also cause data to be sent to the host device 105. For example, the controller 150 may send data to and/or receive data from the host device 105 via the communication interface 140. The controller 150 also sends data and/or commands to and/or receives data from, the memory device 155.

The controller 150 includes or is otherwise associated with an unmap command analysis system 180. The unmap command analysis system 180 determines an unmap command size of an unmap command (e.g., a range of LBAs that will be unmapped during execution of unmap commands) received from the host device 105. In an example, the unmap commands that are received from the host device 105 are SCSI unmap commands.

In an example, the unmap command analysis system 180 determines or identifies an initial unmap command size for unmap commands that are executed on the data storage device 110. For example, when the data storage device 110 is connected to the host device 105, a parameter inquiry is sent from the host device 105 to the unmap command analysis system 180. The unmap command analysis system 180 responds to the parameter query with various information including, but not limited to, the initial unmap command size that the unmap command analysis system 180 supports.

In an example, the initial unmap command size is predetermined. For example, the data storage device 110 may not have any data (or a minimum amount of random data) when it is first connected to the host device 105. As such, the initial unmap command size is a first predetermined size/value (e.g., 2 GB).

In another example, the initial unmap command size is based, at least in part, on the information stored in the unmap command size table 175. For example, when the data storage device 110 is initially connected to the host device 105, the unmap command analysis system 180 determines the amount of the first type of data (e.g., sequential data) and/or the amount of the second type of data (e.g., random data) stored in the data storage device 110. When the amount or percentage of one or more of the different types of data is determined, the unmap command analysis system 180 compares the amount of the determined type of data (e.g., random data) stored in the data storage device 110 to the unmap command size table 175. The unmap command analysis system 180 selects the unmap command size based on the information in the unmap command size table 175. In an example, the unmap command size is then communicated to the host device 105.

However, over time, the amount or percentage of the first type of data and/or the second type of data stored by the data storage device 110 changes (e.g., either increases or decreases). As such, the unmap command analysis system 180 is operable to dynamically determine whether to update or change the unmap command size of the unmap commands that are executed. In an example, the command analysis system 180 determines whether to update the unmap command size based on one or more triggers or events.

For example, the unmap command analysis system 180 determines the amount of random data stored by the data storage device 110 when a threshold number of operations (e.g., 1000 write operations and/or unmap operations) have been received by, and/or executed on, the data storage device 110. In another example, the unmap command analysis system 180 determines the amount of random data stored by the data storage device 110 when a threshold amount of data (e.g., 4 GB) has been written to and/or unmapped from, the data storage device 110. In another example, the unmap command analysis system 180 determines the amount of random data stored by the data storage device 110 when the unmap command analysis system 180 determines a threshold amount of idle time (e.g., ten seconds) is or will be available. Although specific examples are given, other triggers and/or events may be used.

When the amount of random data stored by the data storage device 110 has been determined, the unmap command analysis system 180 determines whether the initial (or the current) unmap command size should be updated. In an example, the unmap command analysis system 180 determines whether the unmap command size should be updated by comparing the current amount or percentage of random data to a previously determined amount or percentage of random data. If the comparison indicates that the percentage of random data has changed by over a threshold amount (e.g., the data storage device previously stored 10% random data and now stores 30% random data), the command analysis system 180 determines that the unmap command size should be updated. The current amount or percentage of random data is then used to determine the new unmap command size.

In another example, the command analysis system 180 also compares the determined amount of random data to the information in the unmap command size table 175 and a new unmap command size is identified when the amount of random data has changed by at least a threshold amount. For example, if the amount of random data has changed by 10%, the unmap command analysis system 180 determines that a new unmap command size should be used.

As previously explained, the unmap command size table 175 indicates a size of unmap commands that are most efficient or optimal (when compared to other sizes of unmap commands) based, at least in part, on the determined amount of random data stored by the data storage device 110. Although an amount or a percentage of random data is specifically mentioned, the amount or percentage of sequential data may also be used.

Figure 2:
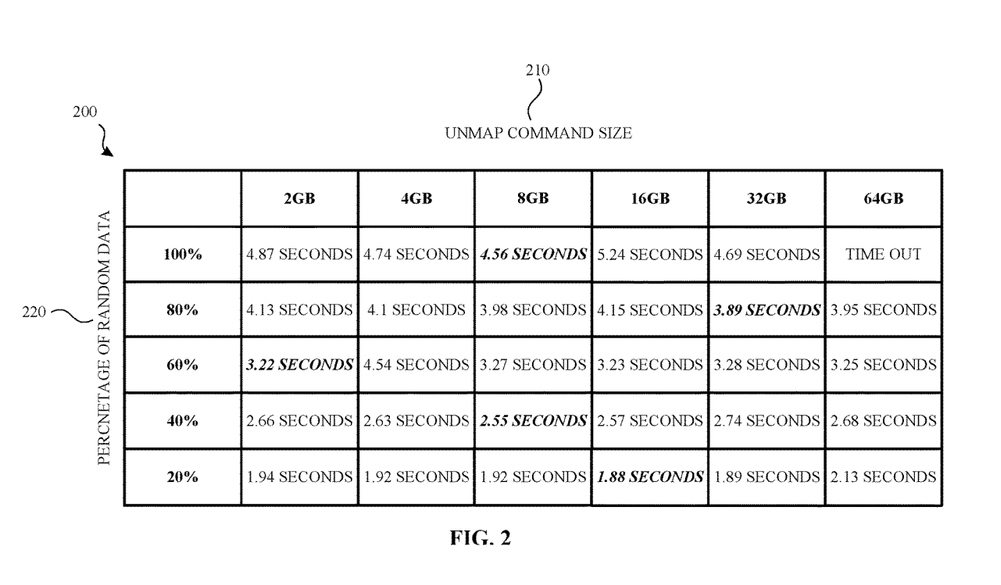
FIG. 2 illustrates an unmap command size table according to an example.

For example and referring to FIG. 2, FIG. 2 illustrates an unmap command size table 200 according to an example. In an example, the unmap command size table 200 is similar to the unmap command size table 175 (FIG. 1). Although a table is specifically mentioned, the information stored in, or otherwise associated with, the unmap command size table 200 may be stored in any data structure or may otherwise be stored by a data storage device.

In an example, the unmap command size table 200 is generated during a configuration event in which a test data storage device is filled with different amounts of different types of data (e.g., random data and sequential data) such as previously described. When the unmap command size table 200, or information associated with the unmap command size table 200, is generated, it is provided to and/or stored by a data storage device such as, for example, the data storage device 110 shown and described with respect to FIG. 1. For example, the unmap command size table 200, or information associated with the unmap command size table, is stored in firmware of the data storage device 110.

The unmap command size table 200 includes performance information associated with an unmap command size 210 and a percentage of random data 220 stored in the data storage device. For example, the unmap command size table 200 includes an amount of time it took to format or perform a full capacity unmap operation on the test data storage device when the test data storage device was filled with a particular percentage of random data 220 and with a particular unmap command size 210.

For example, the unmap command size 210 ranges from 2 GB to 64 GB. Additionally, the percentage of random data 220 ranges from 100% to 20%. Although particular ranges and sizes are shown and described, any granularity of the percentage of random data 220 may be used. For example, the unmap command size table 200 may include random data increments of 10%, of 5%, of 30% and so on. Likewise, the unmap command size 210 may include sizes lower than 2 GB or higher than 64 GB.

In the example shown in FIG. 2, when the data storage device includes 100% random data, the fastest or most efficient unmap command size 210 is 8 GB (indicated by the 4.56 seconds shown in bold italic font). Likewise, when the data storage device includes 80% random data, the fastest or most efficient unmap command size 210 is 32 GB (indicated by the 3.89 seconds shown in bold italic font). However, when the data storage device includes 60% random data, the fastest or most efficient command size is 2 GB.

Although FIG. 2 shows that the unmap command size table includes performance information (e.g., the amount of time required to complete the unmap command), this information may be omitted when the unmap command size table 200, or when the information (e.g., percentage of random data 220 and the unmap command size 210) associated with the unmap command size table 200, is provided to and/or stored by the data storage device.

Referring back to FIG. 1, when the optimal unmap command size for the determined amount of random data is identified, the unmap command analysis system 180 notifies the host device 105 of the newly determined unmap command size. For example, the unmap command analysis system 180 notifies the host device 105 that it wants to update the unmap command size or maximum unmap command size.

The notification is provided from the unmap command analysis system 180 to the host device 105 in response to the controller 150 and/or the unmap command analysis system 180 receiving a command from the host device 105. In an example, using SCSI communication protocol, the unmap command analysis system 180 notifies the host device 105 using a "Unit Attention Condition" response to a host request. The response includes an additional sense code set to "Inquiry Data Changed".

The unmap command analysis system 180 then provides the new/updated unmap command size to the host device 105. When unmap commands are subsequently received by the unmap command analysis system 180, the unmap commands are executed using the new/updated unmap command size.

Figure 3:
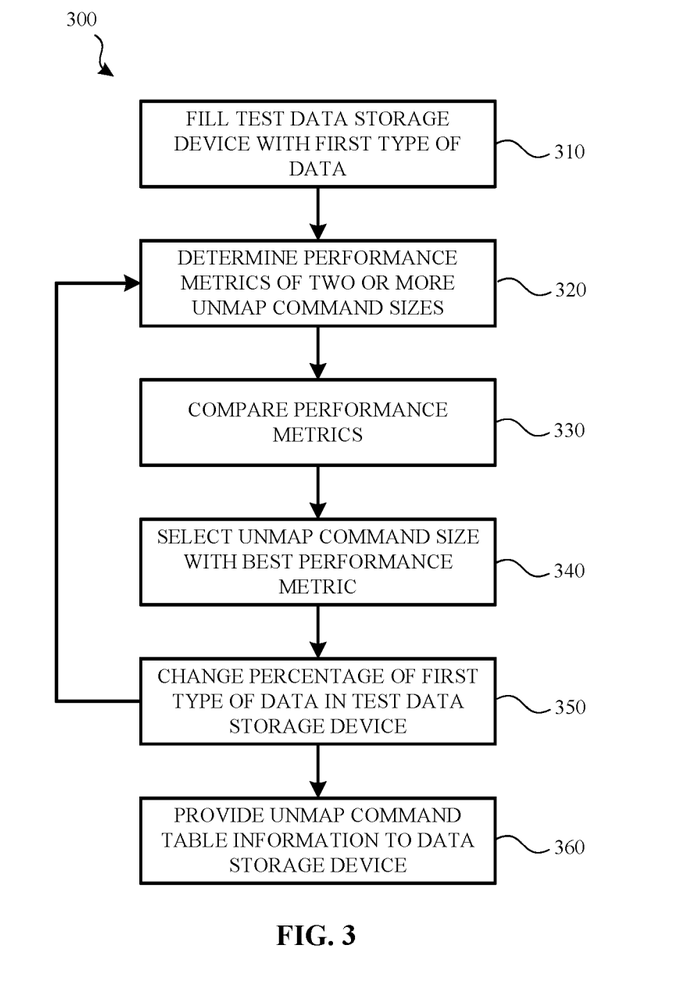
FIG. 3 illustrates a method for populating an unmap command size table according to an example.

FIG. 3 illustrates a method 300 for populating an unmap command size table according to an example. In an example, the method 300 is performed on a test data storage device and the information derived from the method 300 is provided to one or more data storage devices that are similar to the test data storage device. For example, the information derived from the method 300 is provided to the unmap command size table 175 of the data storage device 110 shown and described with respect to FIG. 1.

Method 300 begins when the test data storage device is filled (310) with a first type of data (e.g., sequential data). For example, during a configuration or testing operation, the test data storage device is completely filled with sequential data.

When the test data storage device is filled with sequential data, performance metrics of two or more unmap command sizes are determined (320). For example, performance metrics of a first unmap command size (e.g., 2 GB) is determined. Likewise, performance metrics of a second unmap command size (e.g., 4 GB) is determined.

When the performance metrics of the two or more unmap command sizes are determined, the performance metrics are compared (330). Additionally, the unmap command size with the best performance metric is selected (340).

When the unmap command size with the best performance metric is selected, the percentage of the first type of data (e.g., sequential data) in the test data storage device is changed (350). For example, if the initial amount of sequential data in the test data storage device is 100% (or the initial amount of random data in the test data storage device is 0%), the amount of random data stored in the test data storage device is increased to 5%. Although 5% is specifically mentioned, the percentage of random data stored in the data storage device may be changed by any amount.

The operations above may then be repeated any number of times. For example, operations 310-350 may be repeated until the amount of random data stored in the data storage device reaches 100%. When the unmap command size table is populated with the determined information, the unmap command table information is provided (360) to one or more data storage devices. In an example, the unmap command table information is stored in firmware of the data storage device.

Figure 4:
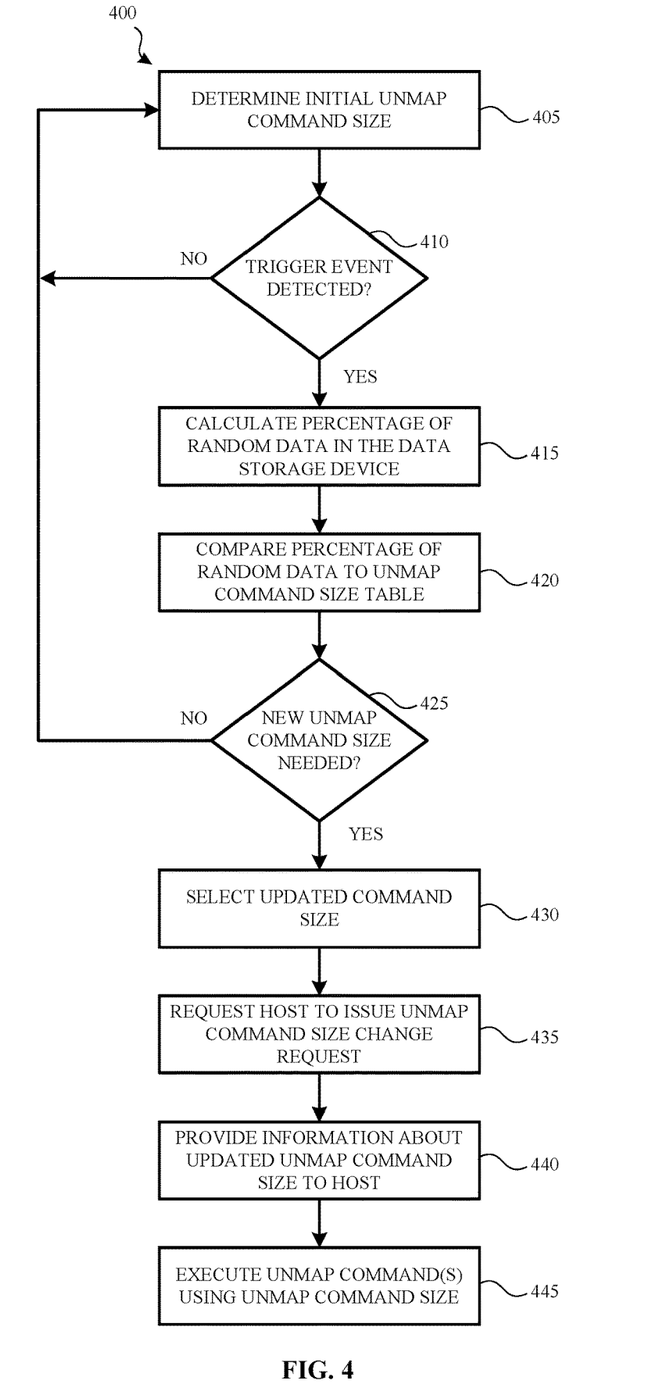
FIG. 4 illustrates a method for updating an unmap command size associated with a data storage device according to an example.

FIG. 4 illustrates a method 400 for updating an unmap command size associated with a data storage device according to an example. In an example, the method 400 is performed by a controller (e.g., the controller 150 (FIG. 1)) and/or an unmap command analysis system (e.g., the unmap command analysis system 180 (FIG. 1)) of a data storage device (e.g., the data storage device 110 (FIG. 1)).

In an example, the method 400 begins when the data storage device is communicatively coupled to a host device and an initial unmap command size is identified or determined (405). For example, when the data storage device is communicatively coupled to the host device, an initial handshake between the devices occurs. As part of the handshake, the host device provides an inquiry about the unmap command sizes that data storage device supports. In response to the inquiry, the unmap command analysis system informs the host device that it is capable of servicing unmap commands and the maximum unmap command size.

When the initial unmap command size is determined or identified, the unmap command analysis system monitors the data storage device to detect (410) or identify a trigger event. In an example, the trigger event is associated with a threshold number of operations that have been received by, and/or executed on, the data storage device. In another example, the trigger event is associated with a threshold amount of data being written to and/or unmapped from the data storage device. In yet another example, the trigger event is associated with a threshold amount of idle time being available for the data storage device. Although specific examples are given, other trigger events may be monitored.

If a trigger event is not detected (410), the unmap command analysis continues to monitor for trigger events. However, if a trigger event is detected (410) by the unmap command analysis system, the command analysis system calculates (415) a percentage of random data in the data storage device. Although a percentage of random data is specifically mentioned, a percentage of sequential data may be calculated in lieu of, or in addition to, the calculation of random data.

When the percentage of random data has been calculated, the unmap command analysis system compares (420) the percentage of random data to information in an unmap command size table. Based on the comparison, the unmap command analysis system determines (425) whether a new or updated command size is needed.

For example, if a current unmap command size is 2 GB (e.g., because the previous amount of random data in the data storage device was 65%), but the unmap command analysis system determines that the current percentage of random data in the data storage device is 40%, the unmap command analysis system determines (425), based on the information in the unmap command size table, that the most efficient or optimal unmap command size is 8 GB (e.g., based on the information in the unmap command size table 200 (FIG. 2)). As such, the new or updated unmap command size (e.g., the 8 GB unmap command size) is selected (430).

However, if the current unmap command size is 2 GB (e.g., because the previous amount of random data in the data storage device was 65%) but the unmap command analysis system determines that the current percentage of random data in the data storage device is 75%, the unmap command analysis system determines (425), based on the information in the unmap command size table, that the most efficient or optimal unmap command size is 2 GB (e.g., based on the information in the unmap command size table 200 (FIG. 2)). As such, the unmap command size is unchanged and the unmap command analysis system continues to monitor for trigger events.

However, when the updated unmap command is selected (430) the unmap command analysis system requests (435) that the host issue an unmap command size change request. In response to receiving the unmap command size change request, the unmap command analysis system provides (440) information about the updated unmap command size to the host device. When unmap commands are subsequently received from the host device, the unmap command analysis system executes (445) the unmap commands using the updated unmap command size.

Figure 5:
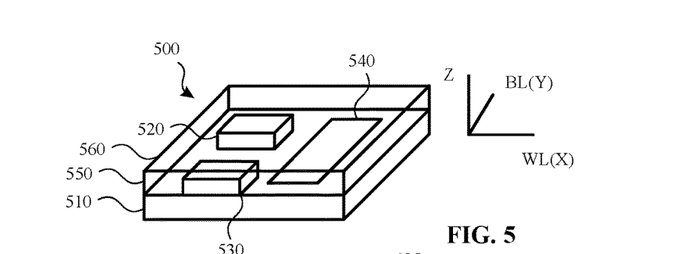
FIG. 5 is a perspective view of a storage device that includes three-dimensional (3D) stacked non-volatile memory according to an example.
Figure 6:
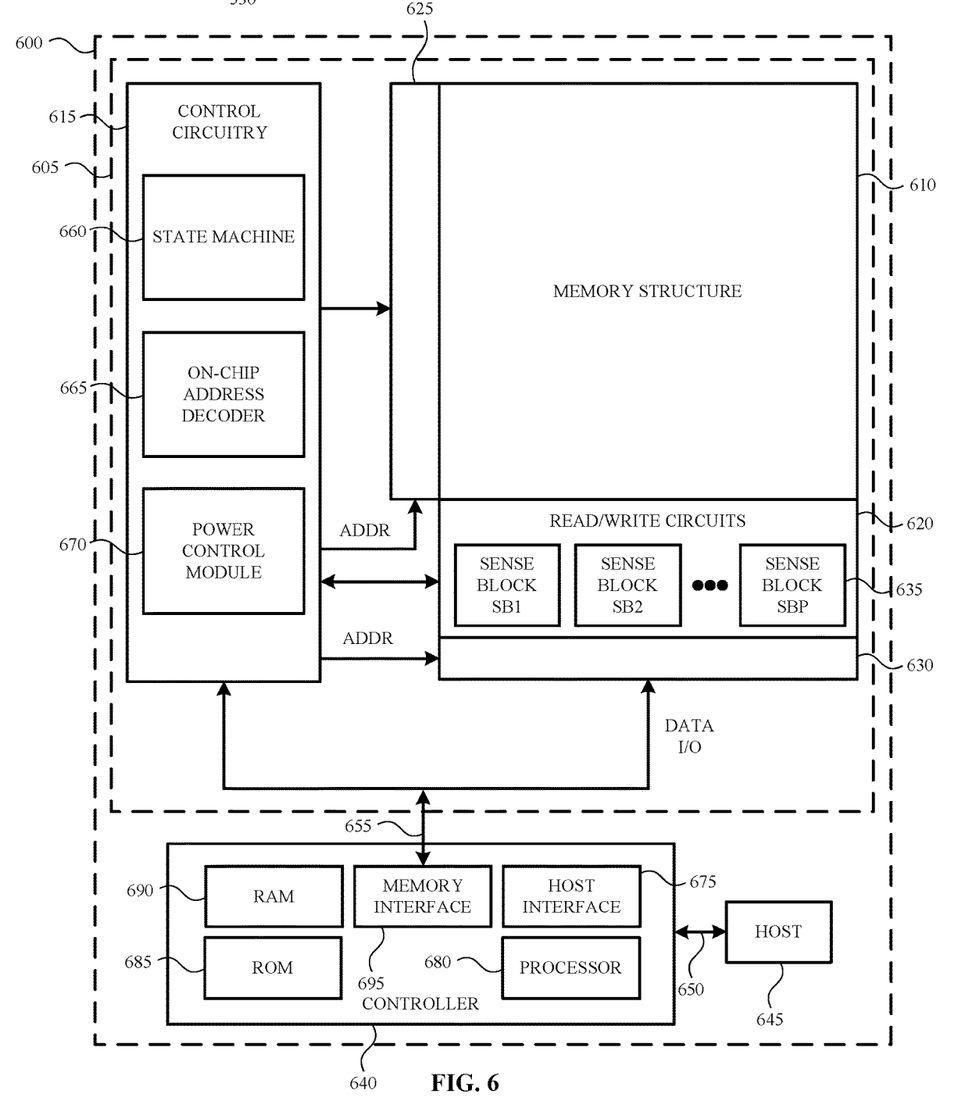
FIG. 6 is a block diagram of a data storage device according to an example.

FIG. 5-FIG. 6 describe example storage devices that may be used with or otherwise implement the various features described herein. For example, the storage devices shown and described with respect to FIG. 5-FIG. 6 may include various systems and components that are similar to the systems and components shown and described with respect to FIG. 1. For example, the controller 640 shown and described with respect to FIG. 6 may be similar to the controller 150 of FIG. 1. Likewise, the memory dies 605 may be similar to the first memory die 165 and/or the second memory die 170 of FIG. 1.

FIG. 5 is a perspective view of a storage device 500 that includes three-dimensional (3D) stacked non-volatile memory according to an example. In this example, the storage device 500 includes a substrate 510. Blocks of memory cells are included on or above the substrate 510. The blocks may include a first block 520 (BLK0) and a second block 530 (BLK1). Each block may be formed of memory cells (e.g., non-volatile memory elements). The substrate 510 may also include a peripheral area 540 having support circuits that are used by the first block 520 and the second block 530. The peripheral area 540 may be located beneath the first block 520 and the second block 530. In another example, the peripheral area may be included on a different substrate or die.

The substrate 510 may also carry circuits under the blocks, along with one or more lower metal layers which are patterned in conductive paths to carry signals from the circuits. The blocks may be formed in an intermediate region 550 of the storage device 500. The storage device may also include an upper region 560. The upper region 560 may include one or more upper metal layers that are patterned in conductive paths to carry signals from the circuits. Each block of memory cells may include a stacked area of memory cells. In an example, alternating levels of the stack represent wordlines. While two blocks are depicted, additional blocks may be used and extend in the x-direction and/or the y-direction.

In an example, a length of a plane of the substrate 510 in the x-direction represents a direction in which signal paths for wordlines or control gate lines extend (e.g., a word line or drain-end select gate (SGD) line direction) and the width of the plane of the substrate 510 in the y-direction represents a direction in which signal paths for bit lines extend (e.g., a bit line direction). The z-direction represents a height of the storage device 500.

FIG. 6 is a functional block diagram of a storage device 600 according to an example. In an example, the storage device 600 may be the 3D stacked non-volatile storage device 500 shown and described with respect to FIG. 5. The components depicted in FIG. 6 may be electrical circuits. In an example, the storage device 600 includes one or more memory dies 605. Each memory die 605 includes a three-dimensional memory structure 610 of memory cells (e.g., a 3D array of memory cells), control circuitry 615, and read/write circuits 620. In another example, a two-dimensional array of memory cells may be used. The memory structure 610 is addressable by wordlines using a first decoder 625 (e.g., a row decoder) and by bit lines using a second decoder 630 (e.g., a column decoder). The read/write circuits 620 may also include multiple sense blocks 635 including SB1, SB2, ..., SBp (e.g., sensing circuitry) which allow pages of the memory cells to be read or programmed in parallel. The sense blocks 635 may include bit line drivers.

In an example, a controller 640 is included in the same storage device 600 as the one or more memory dies 605. In another example, the controller 640 is formed on a die that is bonded to a memory die 605, in which case each memory die 605 may have its own controller 640. In yet another example, a controller die controls all of the memory dies 605.

Commands and data may be transferred between a host 645 and the controller 640 using a data bus 650. Commands and data may also be transferred between the controller 640 and one or more of the memory dies 605 by way of lines 655. In one example, the memory die 605 includes a set of input and/or output (I/O) pins that connect to lines 655.

The memory structure 610 may also include one or more arrays of memory cells. The memory cells may be arranged in a three-dimensional array or a two-dimensional array. The memory structure 610 may include any type of non-volatile memory that is formed on one or more physical levels of arrays of memory cells having an active area disposed above a silicon substrate. The memory structure 610 may be in a non-volatile memory device having circuitry associated with the operation of the memory cells, whether the associated circuitry is above or within the substrate.

The control circuitry 615 works in conjunction with the read/write circuits 620 to perform memory operations (e.g., erase, program, read, and others) on the memory structure 610. The control circuitry 615 may include registers, ROM fuses, and other devices for storing default values such as base voltages and other parameters.

The control circuitry 615 may also include a state machine 660, an on-chip address decoder 665, and a power control module 670. The state machine 660 may provide chip-level control of various memory operations. The state machine 660 may be programmable by software. In another example, the state machine 660 does not use software and is completely implemented in hardware (e.g., electrical circuits).

The on-chip address decoder 665 may provide an address interface between addresses used by host 645 and/or the controller 640 to a hardware address used by the first decoder 625 and the second decoder 630.

The power control module 670 may control power and voltages that are supplied to the wordlines and bit lines during memory operations. The power control module 670 may include drivers for word line layers in a 3D configuration, select transistors (e.g., SGS and SGD transistors) and source lines. The power control module 670 may include one or more charge pumps for creating voltages.

The control circuitry 615, the state machine 660, the on-chip address decoder 665, the first decoder 625, the second decoder 630, the power control module 670, the sense blocks 635, the read/write circuits 620, and/or the controller 640 may be considered one or more control circuits and/or a managing circuit that perform some or all of the operations described herein.

In an example, the controller 640, is an electrical circuit that may be on-chip or off-chip. Additionally, the controller 640 may include one or more processors 680, ROM 685, RAM 690, memory interface 695, and host interface 675, all of which may be interconnected. In an example, the one or more processors 680 is one example of a control circuit. Other examples can use state machines or other custom circuits designed to perform one or more functions. Devices such as ROM 685 and RAM 690 may include code such as a set of instructions. One or more of the processors 680 may be operable to execute the set of instructions to provide some or all of the functionality described herein.

Alternatively or additionally, one or more of the processors 680 may access code from a memory device in the memory structure 610, such as a reserved area of memory cells connected to one or more wordlines. The memory interface 695, in communication with ROM 685, RAM 690, and one or more of the processors 680, may be an electrical circuit that provides an electrical interface between the controller 640 and the memory die 605. For example, the memory interface 695 may change the format or timing of signals, provide a buffer, isolate from surges, latch I/O, and so forth.

The one or more processors 680 may issue commands to control circuitry 615, or any other component of memory die 605, using the memory interface 695. The host interface 675, in communication with the ROM 685, the RAM 695, and the one or more processors 680, may be an electrical circuit that provides an electrical interface between the controller 640 and the host 645. For example, the host interface 675 may change the format or timing of signals, provide a buffer, isolate from surges, latch I/O, and so on. Commands and data from the host 645 are received by the controller 640 by way of the host interface 675. Data sent to the host 645 may be transmitted using the data bus 650.

Multiple memory elements in the memory structure 610 may be configured so that they are connected in series or so that each element is individually accessible. By way of a non-limiting example, flash memory devices in a NAND configuration (e.g., NAND flash memory) typically contain memory elements connected in series. A NAND string is an example of a set of series-connected memory cells and select gate transistors.

A NAND flash memory array may also be configured so that the array includes multiple NAND strings. In an example, a NAND string includes multiple memory cells sharing a single bit line and are accessed as a group. Alternatively, memory elements may be configured so that each memory element is individually accessible (e.g., a NOR memory array). The NAND and NOR memory configurations are examples and memory cells may have other configurations.

The memory cells may be arranged in the single memory device level in an ordered array, such as in a plurality of rows and/or columns. However, the memory elements may be arrayed in non-regular or non-orthogonal configurations, or in structures not considered arrays.

In an example, a 3D memory structure may be vertically arranged as a stack of multiple 2D memory device levels. As another non-limiting example, a 3D memory array may be arranged as multiple vertical columns (e.g., columns extending substantially perpendicular to the major surface of the substrate, such as in the y direction) with each column having multiple memory cells. The vertical columns may be arranged in a two-dimensional arrangement of memory cells, with memory cells on multiple vertically stacked memory planes. Other configurations of memory elements in three dimensions can also constitute a 3D memory array.

In another example, in a 3D NAND memory array, the memory elements may be coupled together to form vertical NAND strings that traverse across multiple horizontal memory device levels. Other 3D configurations can be envisioned wherein some NAND strings contain memory elements in a single memory level while other strings contain memory elements which span through multiple memory levels. 3D memory arrays may also be designed in a NOR configuration and in a RAM configuration.

Based on the above, examples of the present disclosure describe a method, comprising: performing a first unmap command on a first range of logical block addresses (LBAs) of a memory device using a first unmap command size, the first unmap command size being associated with a first amount of a type of data stored in the memory device; determining a current amount of the type of data in the memory device; determining whether the current amount of the type of data in the memory device is associated with a second unmap command size that is different than the first unmap command size; and based, at least in part, on determining the current amount of the type of data in the memory device is associated with the second unmap command size, performing a second unmap command on a second range of LBAs using the second unmap command size. In an example, the method also includes providing a notification to a host device that a size of unmap commands has changed from the first unmap command size to the second unmap command size. In an example, the current amount of the type of data in the memory device is determined when a threshold number of commands have been executed. In an example, the threshold number of commands are selected from a group of commands comprising at least one of: a write command; and an unmap command. In an example, the current amount of the type of data in the memory device is determined when the memory device has a threshold amount of available idle time. In an example, determining whether the current amount of the type of data in the memory device is associated with a second unmap command size that is different than the first unmap command size comprises: comparing the current amount of the type of data to an unmap command size table stored by the memory device, the unmap command size table specifying unmap command sizes for a plurality of unmap commands based, at least in part, on an amount of the type of data stored by the memory device; and determining whether the current amount of the type of data is associated with the second unmap command size or the first unmap command size. In an example, the unmap command size table is populated during configuration of the memory device. In an example, the first unmap command size is a predetermined size.

Examples also describe a data storage device, comprising: a controller; and an unmap command analysis system operable to: determine an amount of random data stored in the data storage device; compare the amount of random data stored in the data storage device to information associated with an unmap command size table; and set an unmap command size of an unmap command based, at least in part, on the information associated with the unmap command size table. In an example, the unmap command analysis system is further operable to request an unmap command size change request from a host device. In an example, the unmap command analysis system is further operable to provide the unmap command size of the unmap command to the host device in response to receiving the unmap command size change request. In an example, the amount of random data in the data storage device is determined when a threshold number of commands have been executed. In an example, the amount of random data in the data storage device is determined when the data storage device has a threshold amount of available idle time. In an example, the unmap command analysis system compares the amount of random data stored in the data storage device to the information associated with the unmap command size table when a change in the amount of random data stored by the data storage device exceeds a threshold. In an example, the unmap command analysis system is operable to: compare a current amount of random data stored by the data storage device to a previously determined amount of random data storage by the data storage device; and determine, based at least in part, on the comparison, determine whether the change in the amount of random data stored by the data storage device exceeds the threshold. In an example, the unmap command size table is populated during configuration of the data storage device.

Additional examples describe a data storage device, comprising: means for determining an amount of random data stored in the data storage device; means for comparing the amount of random data stored in the data storage device to unmap command size information; and means for configuring an unmap command size for an unmap command based, at least in part, on the information associated with the unmap command size information. In an example, the data storage device also includes means for requesting an unmap command size change request from a host device. In an example, the data storage device also includes means for providing the unmap command size of the unmap command to the host device in response to receiving the unmap command size change request. In an example, the amount of random data in the data storage device is determined when a threshold number of commands have been executed.

One of ordinary skill in the art will recognize that the technology described herein is not limited to a single specific memory structure, but covers many relevant memory structures within the spirit and scope of the technology as described herein and as understood by one of ordinary skill in the art.

The description and illustration of one or more aspects provided in the present disclosure are not intended to limit or restrict the scope of the disclosure in any way. The aspects, examples, and details provided in this disclosure are considered sufficient to convey possession and enable others to make and use the best mode of claimed disclosure.

The claimed disclosure should not be construed as being limited to any aspect, example, or detail provided in this disclosure. Regardless of whether shown and described in combination or separately, the various features (both structural and methodological) are intended to be selectively rearranged, included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Aspects of the present disclosure have been described above with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

References to an element herein using a designation such as "first," "second," and so forth does not generally limit the quantity or order of those elements. Rather, these designations may be used as a method of distinguishing between two or more elements or instances of an element. Thus, reference to first and second elements does not mean that only two elements may be used or that the first element precedes the second element. Additionally, unless otherwise stated, a set of elements may include one or more elements.

Terminology in the form of "at least one of A, B, or C" or "A, B, C, or any combination thereof" used in the description or the claims means "A or B or C or any combination of these elements." For example, this terminology may include A, or B, or C, or A and B, or A and C, or A and B and C, or 2A, or 2B, or 2C, or 2A and B, and so on. As an additional example, "at least one of: A, B, or C" is intended to cover A, B, C, A–B, A–C, B–C, and A–B–C, as well as multiples of the same members. Likewise, "at least one of: A, B, and C" is intended to cover A, B, C, A–B, A–C, B–C, and A–B–C, as well as multiples of the same members.

Similarly, as used herein, a phrase referring to a list of items linked with "and/or" refers to any combination of the items. As an example, "A and/or B" is intended to cover A alone, B alone, or A and B together. As another example, "A, B and/or C" is intended to cover A alone, B alone, C alone, A and B together, A and C together, B and C together, or A, B, and C together.

What is claimed is:

1. A method, comprising:
    performing a first unmap command on a first range of logical block addresses (LBAs) of a memory device using a first unmap command size, the first unmap command size being associated with a first amount of random data stored in the memory device;
    determining a current amount of random data in the memory device;
    determining whether the current amount of random data in the memory device is associated with a second unmap command size that is different than the first unmap command size; and
    based, at least in part, on determining the current amount of random data in the memory device is associated with the second unmap command size, performing a second unmap command on a second range of LBAs using the second unmap command size.

2. The method of claim 1, further comprising providing a notification to a host device that a size of unmap commands has changed from the first unmap command size to the second unmap command size.

3. The method of claim 1, wherein the current amount of random data in the memory device is determined in response to a threshold number of commands having been executed.

4. The method of claim 3, wherein the threshold number of commands are selected from a group of commands comprising at least one of:
    a write command; and
    an unmap command.

5. The method of claim 1, wherein the current amount of random data in the memory device is determined in response to the memory device having a threshold amount of available idle time.

6. The method of claim 1, wherein determining whether the current amount of random data in the memory device is associated with the second unmap command size that is different than the first unmap command size comprises:
    comparing the current amount of random data to an unmap command size table stored by the memory device, the unmap command size table specifying unmap command sizes for a plurality of unmap commands based, at least in part, on an amount of random data stored by the memory device; and
    determining whether the current amount of random data is associated with the second unmap command size or the first unmap command size.

7. The method of claim 6, wherein the unmap command size table is populated during configuration of the memory device.

8. The method of claim 1, wherein the first unmap command size is a predetermined size.

9. A data storage device, comprising:
    a controller operable to:
    determine an amount of random data stored in the data storage device;
    compare the amount of random data stored in the data storage device to information stored by an unmap command size table; and
    set an unmap command size of an unmap command based, at least in part, on the information stored by the unmap command size table.

10. The data storage device of claim 9, wherein the controller is further operable to request, from a host device, an unmap command size change request.

11. The data storage device of claim 10, wherein the controller is further operable to provide the unmap command size of the unmap command to the host device in response to receiving the unmap command size change request.

12. The data storage device of claim 9, wherein the amount of random data in the data storage device is determined when a threshold number of commands have been executed.

13. The data storage device of claim 9, wherein the amount of random data in the data storage device is determined when the data storage device has a threshold amount of available idle time.

14. The data storage device of claim 9, wherein the controller compares the amount of random data stored in the data storage device to the information stored by the unmap command size table when a change in the amount of random data stored by the data storage device exceeds a threshold.

15. The data storage device of claim 14, wherein the controller is further operable to:
    compare a current amount of random data stored by the data storage device to a previously determined amount of random data storage by the data storage device; and
    determine, based at least in part on the comparison, whether the change in the amount of random data stored by the data storage device exceeds the threshold.

16. The data storage device of claim 9, wherein the unmap command size table is populated during configuration of the data storage device.

17. A data storage device, comprising:
    means for determining an amount of random data stored in the data storage device;
    means for comparing the amount of random data stored in the data storage device to unmap command size information; and
    means for configuring an unmap command size for an unmap command based, at least in part, on the information associated with the unmap command size information.

18. The data storage device of claim 17, further comprising means for requesting, from a host device, an unmap command size change request.

19. The data storage device of claim 18, further comprising means for providing the unmap command size of the unmap command to the host device in response to receiving the unmap command size change request.

20. The data storage device of claim 17, wherein the amount of random data in the data storage device is determined when a threshold number of commands have been executed.

* * * * *